United States Patent [19]

Matsuno et al.

[11] Patent Number: 5,440,921

[45] Date of Patent: Aug. 15, 1995

[54] DEVICE FOR DETECTING MISFIRE OF INTERNAL COMBUSTION ENGINE

[75] Inventors: Osamu Matsuno; Takashi Aramaki; Katsuhiko Kawamura, all of Kanagawa; Jun Nakanowatari, Tokyo, all of Japan

[73] Assignee: Nissan Motor Co., Ltd., Yokohama, Japan

[21] Appl. No.: 960,819

[22] Filed: Oct. 14, 1992

[30] Foreign Application Priority Data

Oct. 16, 1991 [JP] Japan .................................. 3-267768
Oct. 16, 1991 [JP] Japan .................................. 3-267769

[51] Int. Cl.⁶ .............................................. G01N 15/00
[52] U.S. Cl. .................................. 73/117.3; 364/431.08
[58] Field of Search ...................... 73/116, 117.3, 117.2; 364/431.07, 431.08

[56] References Cited

U.S. PATENT DOCUMENTS

| | | | |
|---|---|---|---|
| 5,041,980 | 8/1991 | Maddock et al. | 73/116 |
| 5,200,899 | 4/1993 | Ribbens et al. | 73/116 |
| 5,222,392 | 6/1993 | Baba et al. | 73/116 |
| 5,237,862 | 8/1993 | Mangrulkar et al. | 73/116 |
| 5,239,473 | 8/1993 | Ribbens et al. | 73/117.3 |
| 5,245,866 | 9/1993 | Hashiguchi et al. | 73/117.3 |

*Primary Examiner*—Richard E. Chilcot, Jr.
*Assistant Examiner*—George Dombroske
*Attorney, Agent, or Firm*—Foley & Lardner

[57] ABSTRACT

In a device for judging of misfire of an internal combustion engine from a variation of crankshaft rotational speed during combustion stroke of each cylinders, a measurement period for measurement of crankshaft rotational speed at a cylinder is set by counting a predetermined number of first signals indicative of a predetermined rotational angle of a crankshaft firstly on the basis of a second signal indicative of a reference position of a camshaft and secondly and onward on the basis of the first signals used for setting the previous measurement section.

5 Claims, 13 Drawing Sheets

MISFIRE   DISTURBANCE

MISFIRE JUDGMENT LEVEL

DEVICE FOR DETECTING MISFIRE OF INTERNAL COMBUSTION ENGINE

BACKGROUND OF THE INVENTION

1. Field of the Invention

The present invention relates to a device for detecting misfire of an internal combustion engine.

2. Description of the Prior Art

A known device for detecting misfire of an internal combustion engine due to failure of ignition, etc. is adapted to diagnose misfire on the basis of a variation of crankshaft rotational speed during combustion strokes of each cylinders.

A problem of the prior art device is that the measurement phases or periods for measurement of crankshaft rotational speed at each cylinders are not constant but liable to vary with respect to the cycle of operations of the engine, resulting in a difficulty of attaining an accurate diagnosis of misfire.

Another problem is that a variation of crankshaft rotational speed which is caused by disturbance, e.g., which may possibly be caused by an impact transferred from the road wheels to the drive train when the vehicle is running on a rough road, is erroneously judged as occurrence of misfire at one cylinder or a plurality of cylinders.

SUMMARY OF THE INVENTION

According to an aspect of the present invention, a device for detecting misfire of an internal combustion engine, comprises first sensor means for detecting an angle of rotation of a crankshaft of the engine and producing first a signal representative thereof, second sensor means for detecting reference a crank angle at each cylinders of the engine and producing a second signal representative thereof, first measurement means for counting, am an initial stage of measurement, a predetermined number of first signals produced by the first sensor means on the basis of a second signal produced by the second sensor means and measuring crankshaft rotation speed at combustion stroke of a corresponding cylinder from a time for lapse of a measurement period during which the predetermined number of first signals are counted, second measurement means for counting, at a secondary stage of measurement, a predetermined number of first signals on the basis of the first signals of the previous measurement period repeatedly and measuring crankshaft rotation speeds at combustion strokes of corresponding cylinders from the times for lapse of the measurement periods during which the predetermined number of first signals are counted, and judging means for judging of misfire on the basis of a variation of crankshaft rotation speeds at the measurement periods during combustion strokes of each cylinders.

According to another aspect of the present invention, a device for detecting misfire of an internal combustion engine, comprises rotational speed measurement means for measuring crankshaft rotational speeds during combustion strokes of each cylinders, and judgment means for judging misfire of the engine from a variation of crankshaft rotational speeds during combustion strokes of each cylinders, in which the rotational speed measurement means includes a first sensor for detecting an angle of rotation of a crankshaft of the engine and producing a first signal representative thereof, a second sensor for detecting a reference crank position at each cylinder of the engine and producing a second signal discriminating a cylinder at which the reference crank position is obtained, and measurement period setting means for setting, at initial measurement, a measurement period for measurement of crankshaft rotational speed at a corresponding cylinder by counting a predetermined number of first signals produced by the first sensor on the basis of a second signal produced by the second sensor and setting, after the initial measurement, measurement periods for measurement of crankshaft rotational speeds at each cylinders by counting a predetermined number of first signals produced by the first sensor on the basis of the first signals of the previous measurement period.

According to a further aspect of the present invention, a device for detecting misfire of an internal combustion engine, comprises rotational speed measurement means for measuring crankshaft rotational speed during a predetermined crank angle interval of each cylinders, first setting means for setting an upper limit of a judgment level, second setting means for setting a lower limit of the judgment level, and misfire judgment means for judging of misfire of each cylinders on the basis of a variation of crankshaft rotation speed, in which the misfire judgment means judges that misfire has occurred when crankshaft rotational speed is larger than the lower limit and equal to or smaller than the upper limit and judges that misfire has not occurred when crankshaft rotational speed exceeds beyond the upper limit.

According to a further aspect of the present invention, a device for detecting misfire of an internal combustion engine, comprises rotational speed measuring means for measuring crankshaft rotational speed during a predetermined crank angle interval of each cylinders, judgment means for judging of misfire of each cylinder on the basis of a variation of crankshaft rotation speed, and suspension means for suspending judgment of misfire when a variation of crankshaft rotational speed during a predetermined crank angle interval of each cylinders occurs with such frequency that is included within a predetermined frequency range and for a predetermined period.

According to a further aspect of the present invention, a device for detecting misfire of an internal combustion engine, comprises rotational speed measuring means for measuring crankshaft rotational speed during a predetermined crank angle interval of each cylinders, judgment means for judging of misfire of each cylinder on the basis of a variation of crankshaft rotational speed, and suspension means for suspending judgment of misfire when a variation of crankshaft rotational speed exceeds beyond a predetermined level for more than a predetermined number off times during a predetermined period.

The above structures are effective for solving the above noted problems inherent in the prior art device.

It is accordingly an object of the present invention to provide an improved device for detecting misfire of an internal combustion engine which can effect an accurate, reliable diagnosis of misfire.

It is a further object of the present invention to provide an improved misfire detecting device of the above described character which has a means for assuredly preventing misjudgment.

It is a further object of the present invention to provide an improved misfire detecting device of the above described character which has a means for suspending judgment of misfire when an abnormality has occurred in a sensor, etc.

It is a further object of the present invention to provide an improved misfire detecting device of the above described character which has a means for suspending judgment of misfire when a vehicle is running on a rough road.

It is a further object of the present invention to provide an improved misfire detecting device of the above described character which has a means for suspending judgment of misfire when clutch engagement is changed.

DESCRIPTION OF THE PREFERRED EMBODIMENTS

Figure 1:
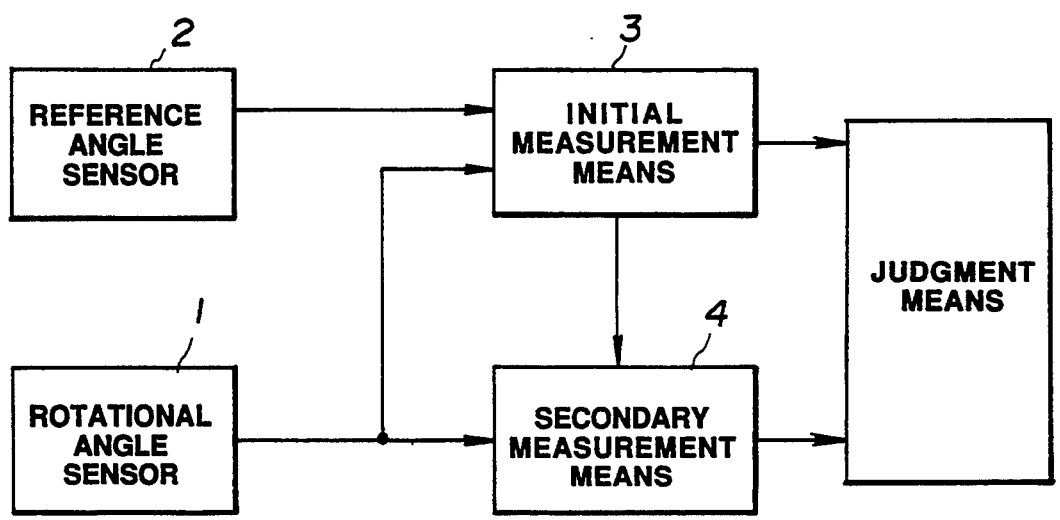
FIG. 1 is a diagrammatic view of a device for detecting misfire of an internal combustion engine according to an embodiment of the present invention.

Referring first to FIG. 1, a misfire detecting device according to an embodiment of the present invention is shown as including a rotational angle sensor 1 for detecting an angle of rotation of a crankshaft and a reference angle sensor 2 for detecting reference crank angles or crank positions at each cylinders.

The device further includes an initial measurement means 3 which, at the initial stage of measurement, starts counting a predetermined number of first signals produced by the rotational angle sensor 1 on the basis of a second signal produced by the reference angle sensor 2 and measures crankshaft rotational speed (i.e., engine rpm) at combustion stroke of a corresponding cylinder from the time for lapse of a measurement period during which the predetermined number of first signals are counted. The device is further provided with a secondary measurement means which counts, at the secondary stage of measurement, i.e., after the above initial measurement, a predetermined number of first signals on the basis of the first signals of the previous measurement period repeatedly and measures crankshaft rotation speeds at combustion strokes of corresponding cylinders from the times for lapse of the measurement periods during which the predetermined number of first signals are counted.

That is, at the initial stage of measurement the measurement period or phase with respect to the cycle of operations of the engine is set on the basis of a predetermined signal produced by the reference angle sensor 2, whereas at the secondary stage of measurement, i.e., after the initial measurement, the measurement period is set on the basis of the signals produced by the rotational angle sensor 1 during the previous measurement period. By this, it becomes possible to measure crankshaft rotational speed during combustion strokes of each cylinders always at the same period or phase with respect to the cycle of operations of the engine.

The device further has a judgment means 5 for judging of misfire in response to signals supplied thereto from the initial and secondary measurement means 3 and 4, i.e., on the basis of a variation of crankshaft rotational speed during combustion strokes of each cylinders.

In the meantime, a phase difference between a predetermined signal produced by the reference angle sensor and a predetermined signal produced by the rotational angle sensor may be measured with a view to suspending judgment of misfire when the phase difference is not within a predetermined range.

Further, in the case where a sensor consisting of a ring gear is used, chipped or worn-out tooth or teeth will cause the phase difference between a predetermined signal produced by the reference angle sensor and a predetermined signal produced by the rotational angle sensor to go beyond a predetermined range. In such a case, judgment of misfire is suspended to prevent misjudgment.

Figure 2:
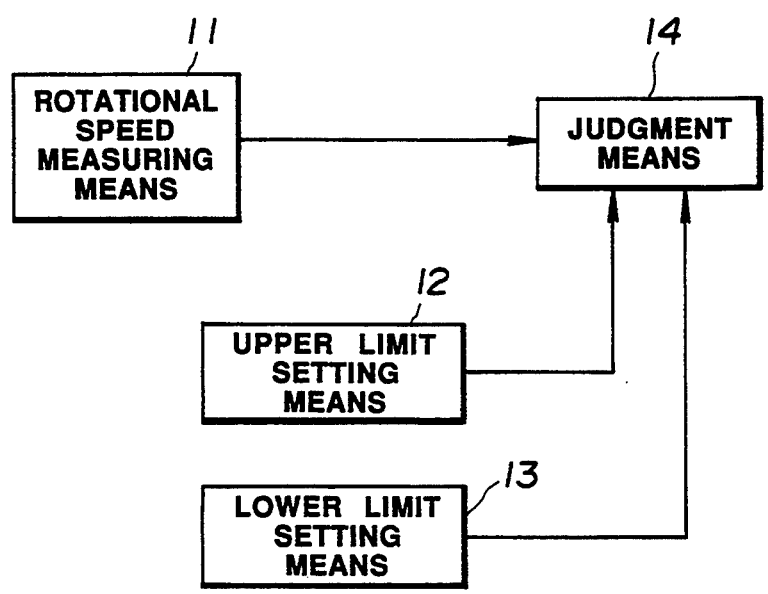
FIG. 2 is a diagrammatic view of a device for detecting misfire of an internal combustion engine according to another embodiment.

FIG. 2 shows a misfire detecting device according to another embodiment of the present invention. The device comprises a rotational speed measuring means 11 for measuring crankshaft rotational speed during a predetermined crank angle interval or measurement period of each cylinders, a first setting means 12 for setting an upper limit off a judgment level, a second setting means 13 for setting a lower limit of the judgment level, and a misfire judgment means 14 for making a judgment of misfire of each cylinders on the basis of a variation of crankshaft rotation speed, wherein the misfire judgment means 14 judges that misfire has occurred when the crankshaft rotational speed is larger than the lower limit and equal to or smaller than the upper limit and judges that misfire has not occurred when the crankshaft rotational speed exceeds beyond the upper limit value.

Figure 3:
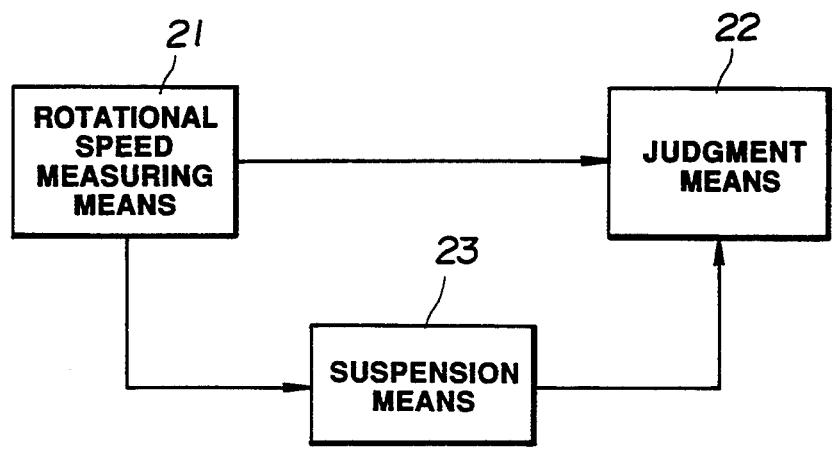
FIG. 3 is a device for detecting misfire of an internal combustion engine according to a further embodiment.

FIG. 3 shows a misfire detecting device according to a further embodiment. The device comprises a rotational speed measuring means 21 for measuring crankshaft rotational speed during a predetermined crank angle interval or measurement period of each cylinders, a judgment means 22 for judging of misfire of each cylinders on the basis of a variation off crankshaft rotational speed, and a suspension means 23 for suspending judgment off misfire when a variation off the crankshaft rotational speed during the predetermined crank angle interval off each cylinders occurs with such frequency that is included within a predetermined frequency range and for a predetermined period or when a variation off crankshaft rotation speed exceeds beyond a predetermined level for more than a predetermined number off times during a predetermined period.

When a vehicle is running on a rough road, etc., a variation off engine rpm (revolution per minute), i.e., crankshaft rotational speed becomes larger. Accordingly, by setting an upper limit to the above variation of engine rpm and judging that a variation off engine rpm exceeding beyond the upper limit is caused by disturbance, it becomes possible to prevent misjudgment.

Further, upon running on a rough road an impact applied to a vehicle causes the engine rpm to vary in a certain cycle repeatedly. Accordingly, by suspending judgment of misfire when an engine rpm exceeds beyond a predetermined level for more than a predetermined number of times during a predetermined period, it becomes possible to prevent misjudgment.

Figure 4:
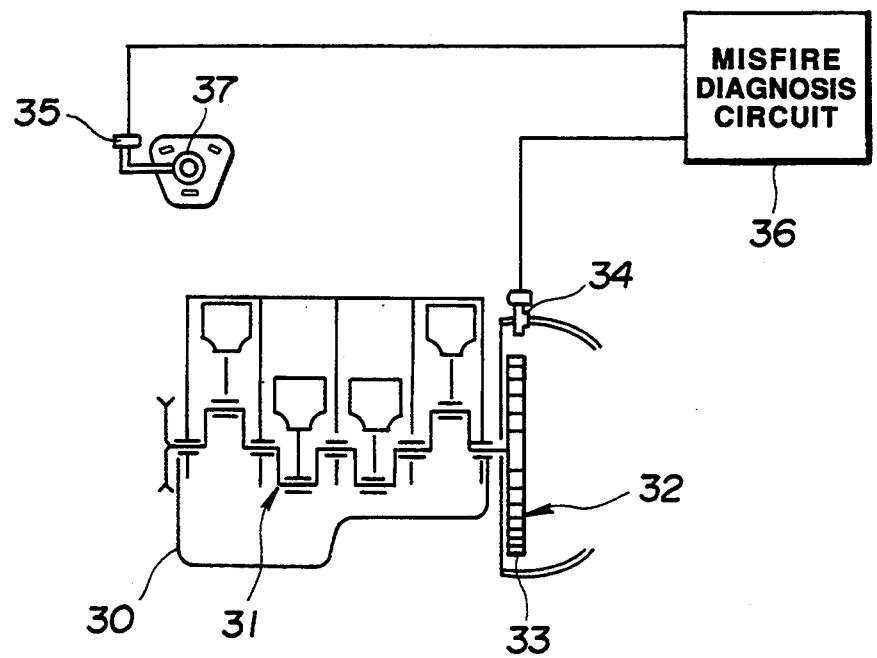
FIG. 4 is a schematic view of a more specific embodiment of the present invention.
Figure 5:
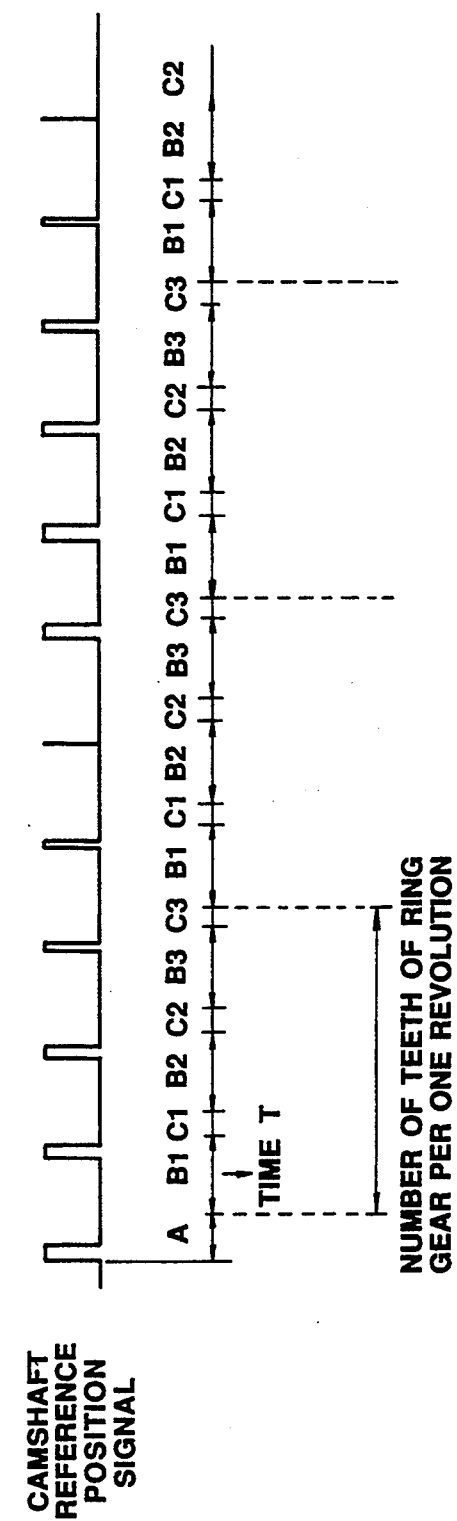
FIG. 5 is a timing chart illustrating measurement of crankshaft rotational speed by the misfire detecting device of FIG. 4.

Referring now to FIGS. 4 and 5, a misfire detecting device according to a more specific embodiment will be described. In FIG. 4, 30 is an engine and 31 is a crankshaft. A flywheel 32 is secured to the crankshaft 31 and formed with a ring gear 33 at the outer circumference thereof. A rotational angle sensor 34 is disposed adjacent to the outer circumference of the ring gear 33.

The rotational angle sensor 34 produces a signal each time when the crankshaft 31 rotates several degrees which is determined depending upon the number of teeth provided to the ring gear 33, which signal is transmitted to a misfire diagnosis circuit 36.

A reference angle sensor 35 is provided to a camshaft 37 which is adapted to rotate in timed relation to the crankshaft 31.

The reference angle sensor 35 produces a reference crank position signal (cylinder discriminating signal) each time when a predetermined crank angle is obtained at each cylinders, which reference crank position signal is transmitted to the misfire diagnosis circuit 36.

The misfire diagnosis circuit 36 measures crankshaft rotational speed or rotational time during combustion strokes of each cylinders on the basis of the signal produced by the reference angle sensor 35 and the signal produced by the rotational angle sensor 34 and diagnoses misfire on the basis of a variation of crankshaft rotational speed (i.e., engine rpm).

In this connection, at the initial stage of measurement, i.e., for a predetermined period after starting of the engine, counting of signals produced by the rotational angle sensor 34 is performed on the basis of a signal produced by the reference angle sensor 35. After counting of a predetermined number of signals produced by the rotational angle sensor 34, a measurement period at combustion stroke of a corresponding cylinder is determined, and crankshaft rotational speed is measured from the time for lapse of the measurement period during which the predetermined number of signals produced by the rotational angle sensor 34 are counted.

After the above initial measurement, counting of signals produced by the rotational angle sensor 34 is continued on the basis of the signals produced by the rotational angle sensor 34 during the initial measurement period so that the following measurement periods at combustion strokes of each cylinders are sequentially determined by repeated counting of a predetermined number of signals produced by the rotational angle sensor 34 and crankshaft rotational speeds at combustion strokes of corresponding cylinders are measured from the times for lapse of the respective measurement periods.

The operation will be described.

Measurement is made in accordance with the timing chart of FIG. 5 (which is by way of example for use in a 6-cylinder engine). When the reference angle sensor 35 produces a reference position signal (which may represent any of the cylinders #1~#6 but the #1 cylinder in this case), counting of the signal from the rotational angle sensor 34 is started at once.

When counting of a predetermined number "A" of signals produced by the rotational angle sensor 34 is finished, counting of a predetermined number "B1" is then started and the time necessitated for its counting is measured.

The signal interval encompassing the predetermined number "B1" of signals represents a measurement period for the #1 cylinder. From the time necessitated for counting of the signals during the measurement period the crankshaft rotational speed at combustion stroke of the #1 cylinder is obtained.

when the initial counting is completed, counting of a predetermined number "C1" of signals produced by the rotational angle sensor 34 is started in succession to the counting of the predetermined number "B1" of signals. Then, counting of a predetermined number "B2" of signals is performed and the time necessitated for its counting is measured.

The predetermined numbers "B1" and "B2" are the same number, and the signal interval "B2" represents the measurement period for measurement of crankshaft rotational speed at combustion stroke of the #2 cylinder. From the time necessitated for counting of the signals during the measurement period, crankshaft rotational speed at combustion stroke of the #2 cylinder is obtained.

When the measurement at the signal interval "B2" is completed, counting of a predetermined number "C2" of signals produced by the rotational angle sensor 34 is performed in succession to the counting of the signals at the signal interval "B2", and then counting of a predetermined number "B3" of signals is performed successively and the time necessitated for its counting is measured.

The predetermined numbers "C2" and "C1" are the same number, whilst the predetermined numbers "B2" and "B1" are the same number. The signal interval represents the measurement period for measurement of crankshaft rotation at combustion stroke of the #3 cylinder. From the time necessitated for counting of signals during the measurement period the rotational speed at combustion stroke of the #3 cylinder is obtained.

Then, when the measurement at the signal interval "B3" is completed, counting of a predetermined number "C3" of signals is performed in succession to counting of the signals at the signal interval "B3", and then counting of a predetermined number "B1" of signals is performed and the time necessitated for its counting is measured.

The predetermined number "C3" is the same as the predetermined number "C2", "C1". The signal interval "B1" in this instance, i.e., of the second occurrence in FIG. 3 represents the measurement period for measurement of crankshaft rotational speed at combustion stroke of the #4 cylinder. The measurement period for the #4 cylinder differs from the measurement period for the #1 cylinder by one rotation of the crankshaft 21 but has the same measurement period or phase therewith. In the similar manner as above, measurement of crankshaft rotational speed at combustion strokes of the #5 cylinder and #6 cylinder is performed.

When the measurement at the #6 cylinder is completed, counting of the predetermined number "C3" of signals produced by the rotational angle sensor 34 is performed so that from the time necessitated for counting of the predetermined number "B1" of signals during the next measurement period the crankshaft rotational speed at combustion stroke of the #1 cylinder is obtained and the above measurements at the #2–#6 cylinders are repeated.

In the meantime, B1+C1+B2+C2+B3+C3=the number of teeth of the ring gear 33.

Diagnosis of misfire at each cylinders is made firstly by comparing with each other the crankshaft rotational speeds sequentially measured at the same measurement periods for making preliminary judgments of misfire for each cylinders, and secondly by making a final judgment of misfire on the basis of the ratio of the number of preliminary judgments that misfire has occurred and the number of preliminary judgments that misfire has not occurred.

In this manner, at the initial stage of measurement, counting of signals produced by the rotational angle sensor 34 is performed on the basis of a signal produced by the reference angle sensor 35 for thereby setting a measurement period at combustion stroke of a certain cylinder. After the initial measurement, counting of signals is performed on the basis of signals produced by the rotational angle sensor 34 for thereby setting the measurement periods during combustion strokes of each cylinders. By this, it becomes possible to perform measurement of crankshaft rotational speed always at the same measurement period with respect to the cycle of operations of the engine.

In the case where a measurement period is set on the basis of a signal produced by the reference angle sensor 35, a relative phase variation between the camshaft 27 associated with the reference angle sensor 35 and the crankshaft 31 associated with the rotational angle sensor 34 or a poor accuracy of timing at which a signal is produced by the reference angle sensor 35 may possibly cause a variation of timing at which counting of signals produced by the rotational angle sensor 34 is started in response to a signal produced by the reference angle sensor 35. However, this is limited to the initial stage of measurement. After a measurement period is once set by counting of signals produced by the rotational angle sensor 34, the following measurement periods can be set sequentially on the basis of the signals of the previous measurement periods irrespectively of a phase variation of the camshaft 37 relative to the crankshaft 31 or an accuracy of the reference angle sensor 35.

By this, it becomes possible to set a measurement period at each cylinder constantly, thus making possible to measure crankshaft rotational speed at constant measurement periods during combustion strokes of each cylinders.

Accordingly, it becomes possible to attain accurate crankshaft rotation speeds at all times, thus making it possible to perform an accurate diagnosis of misfire by the comparison of crankshaft rotational speeds at the same measurement periods and therefore making it possible to attain a highly reliable diagnosis of misfire.

Figure 6:
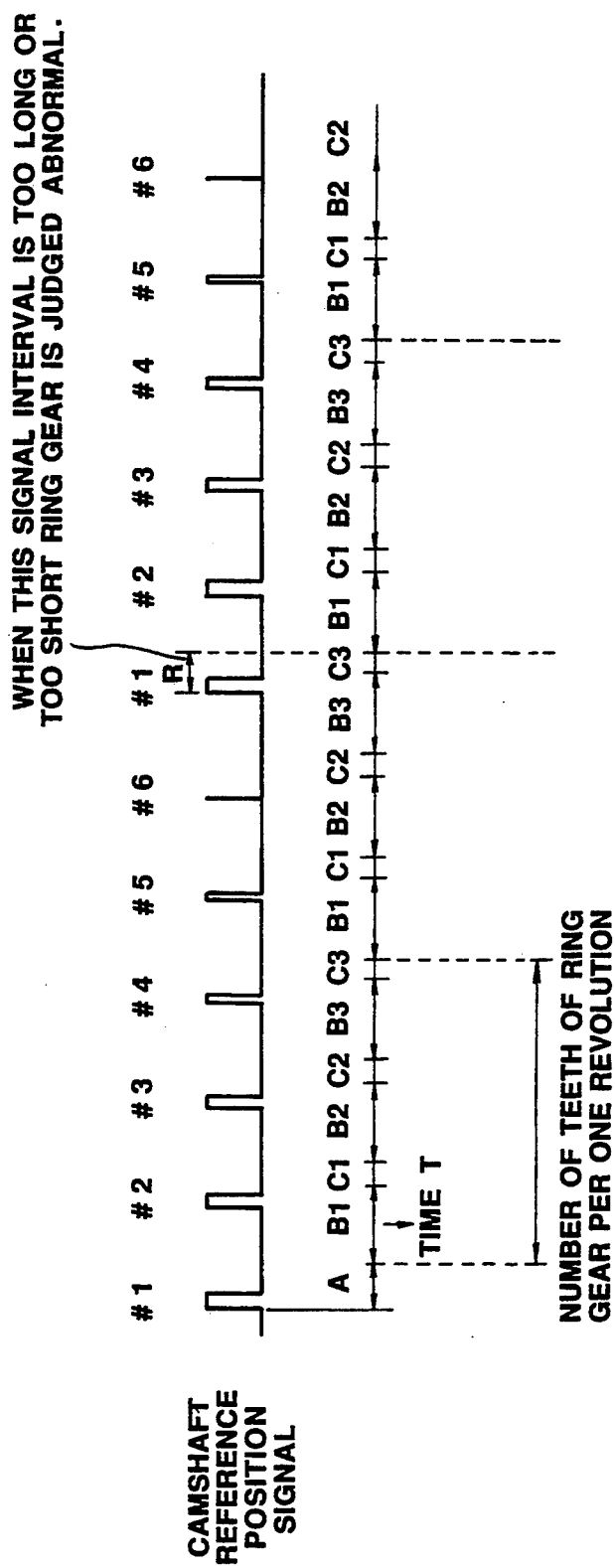
FIG. 6 is a timing chart illustrating measurement of crankshaft rotation speed according to a modification of the present invention.

FIG. 6 shows a timing chart for measurement of misfire in which diagnosis of misfire is stopped or suspended upon occurrence of an abnormality which is judged on the basis of predetermined signals produced by the reference angle sensor 34 and rotational angle sensor 35. The measurement periods for measurement of crankshaft rotation speeds during combustion strokes of each cylinders are set similarly to the previous embodiment. In this embodiment, the phase difference between a signal produced by the reference angle sensor 35 (e.g., a signal for the #1 cylinder) and a signal produced by the rotational angle sensor 35 for the first time during a predetermined measurement period (e.g., signal interval "B1") is measured each time when a signal for the #1 cylinder is produced by the reference angle sensor 34, so that when the phase difference "R" goes beyond a predetermined range or limits diagnosis of misfire on the basis of crankshaft rotation speed is stopped or suspended. In this instance, simultaneously with stopping of diagnosis of misfire a warning may be given.

Figure 7:
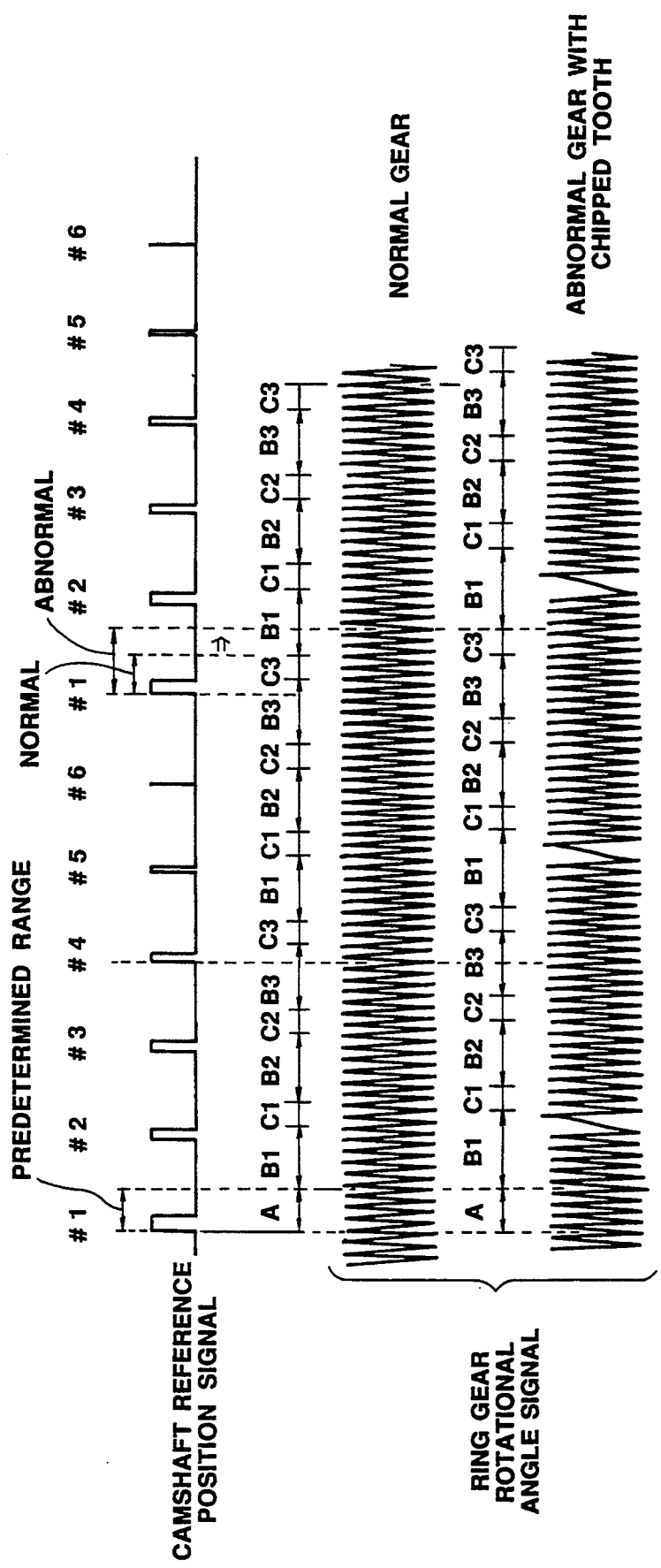
FIG. 7 is a timing chart illustrating measurement of crankshaft rotational speed when a sensor is in an abnormal condition.

Referring to FIG. 7, when the teeth of the ring gear 33 are normal, the rotational angle sensor 35 produces signals at constant intervals, thus making it possible to attain accurate measurement periods. However, when some tooth of the ring gear 33 is Lipped or worn out, some of the signals produced by the rotational angle sensor 35 are caused to get out of position and each move a distance corresponding to one signal when viewed on the timing chart such that the measurement period varies with respect to the cycle of operations of he engine.

Accordingly, by monitoring the phase difference between a predetermined signal produced by the reference angle sensor 34 and a predetermined signal produced by the rotational angle sensor 35, it becomes possible to judge that the ring gear 33, sensor 35 or the like is in an abnormal state when the phase difference goes beyond a predetermined range. In such case, by stopping or suspending preliminary and final judgments of misfire, it becomes possible to prevent misjudgment assuredly.

Figure 8:
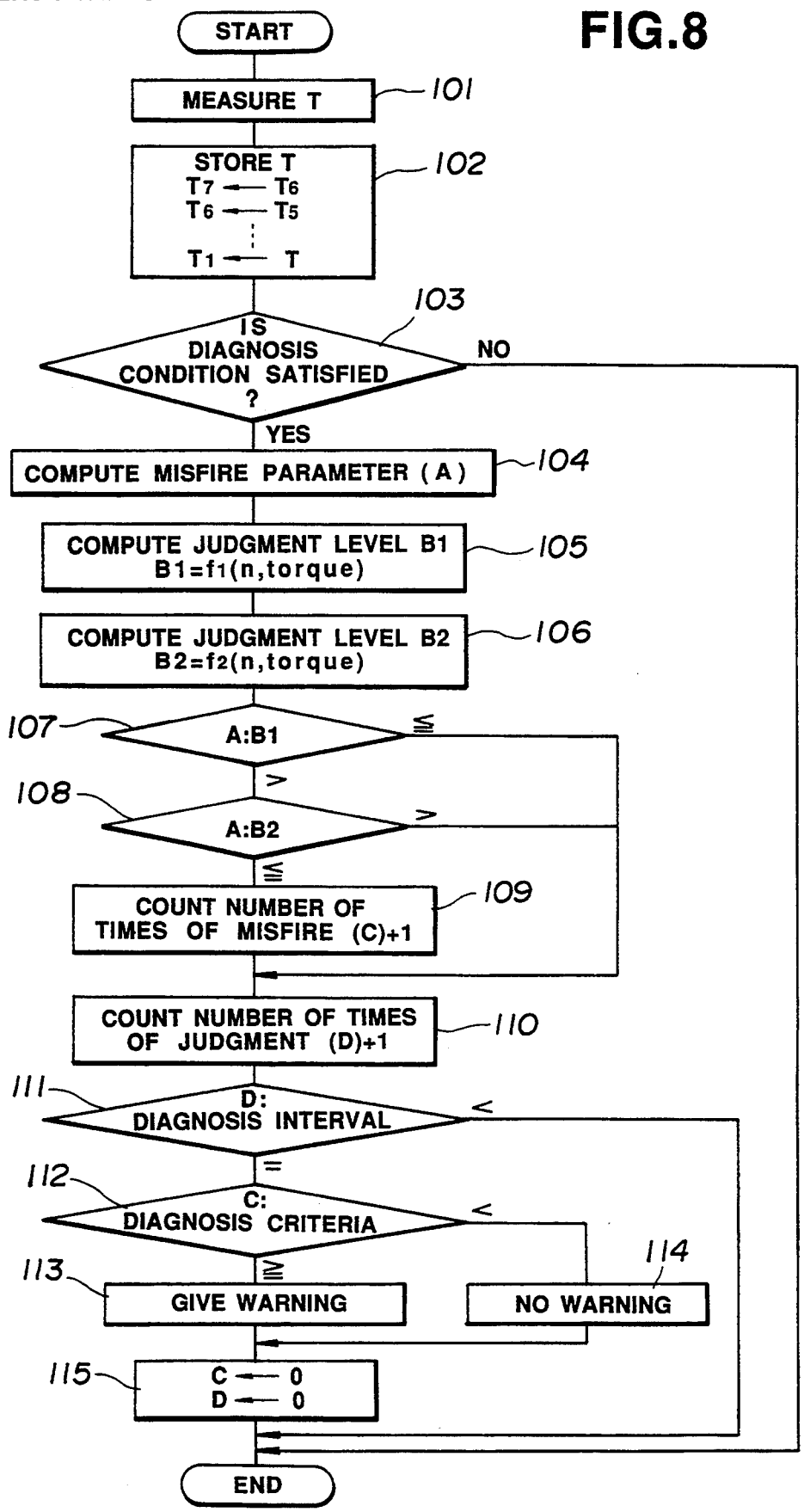
FIG. 8 is a flowchart for judgment of misfire according a further embodiment.

FIG. 8 shows a flowchart for judgment of misfire according to a further embodiment.

Referring to FIG. 8, at steps 101 and 102, a time "T" necessitated for lapse of a predetermined measurement period at combustion stroke of each cylinders is measured from signals produced by the rotational angle sensor 34 of FIG. 4 each time of ignition at each cylinder and is stored. In the case of 6-cylinder engine, the measurement values from this time to the 7th time are stored as $T_1 \sim T_7$ and updated.

At step 103, it is checked whether diagnosis conditions are fulfilled. The diagnosis conditions are judged to be satisfied when the engine rpm, engine load, etc. are within predetermined ranges, respectively.

when the diagnosis conditions are fulfilled, the flow proceeds to step 104 where a misfire parameter "A" for the cylinder for which $T_4$ is measured, is calculated from the following expression on the basis of the rotational times $T_1$, $T_4$, $T_7$.

$$A = \{3 \times (T_4 - T_7) + 3 \times (T_4 - T_1)\}/(T_7)^3 \quad (1)$$

In this instance, $T_4$ is for the cylinder which has the same crank angle interval with the present cylinder, i.e., the cylinder presently subjected to combustion stroke, for which T1 is measured. $T_7$ is a value measured at the last time of measurement with respect to the present cylinder. A multiplier "3" represents a correcting portion for a combustion period at the time of acceleration, etc. $(T_7)^3$ represents a correcting portion for an engine rotational speed (i.e. engine rpm).

That is, a misfire parameter "A" is obtained on the basis of the rotational times of the cylinders having the same crank angle interval.

At steps 105 and 106, a lower limit value $B_1$ and an upper limit value $B_2$ for the judgment level for judgment of the parameter "A" are calculated.

The lower limit value $B_1$ and the upper limit value $B_2$ are retrieved from a data map which is previously set on the basis of engine rpm and engine load (torque).

The lower limit value $B_1$ and the upper limit value $B_2$ become larger as the engine rpm "n" becomes smaller or the engine load (torque) becomes higher. In this connection, the upper limit value $B_2$ may be obtained proportionally to the lower limit value $B_1$.

At steps 107 and 108, the misfire parameter "A" is compared with the lower limit value $B_1$ and the upper limit value $B_2$.

When the misfire parameter "A" is between the lower limit value $B_1$ and the upper limit value $B_2$, it is judged that misfire has occurred, so that the flow proceeds to step 109 where a misfire counter for a corresponding cylinder is made to count +1.

When the misfire parameter "A" is equal to or lower than the lower limit value $B_1$ or exceeds beyond the upper limit value $B_2$, it is judged that misfire has not occurred, so that counting of misfire is not performed.

At each time of judgment of misfire, a counter for counting the number of judgments is made to count +1. At steps 111 and 112, the rate of occurrence of misfire, i.e., the rate of then number of judgments that misfire has occurred to the number of judgments that misfire has not occurred, is calculated when the number of judgments amount to a predetermined value, so that when the rate of occurrence of misfire is equal to or larger than a predetermined value (for example, $1 \sim 2\%$) an indication such as a warning, etc. is issued.

In the meantime, the step 101 corresponds to a rotational speed measuring means 11 in FIG. 2, and the steps 105, 106 correspond to the lower limit setting means 13 and the upper limit setting means 12, and the steps $107 \sim 109$ correspond to the judgment means 14.

In this manner, the rotational times (rotational speeds) during combustion strokes of each cylinders are measured, and the misfire parameter is obtained on the basis of the variation of the rotational times, i.e., obtained from the rotational times measured at the same crank angle intervals for the different cylinders, so that only when the misfire parameter is between the lower limit value and the upper limit value it is judged that misfire has occurred. By this, it becomes possible to detect misfire of each cylinder assuredly and prevent erroneous detection.

Figure 9:
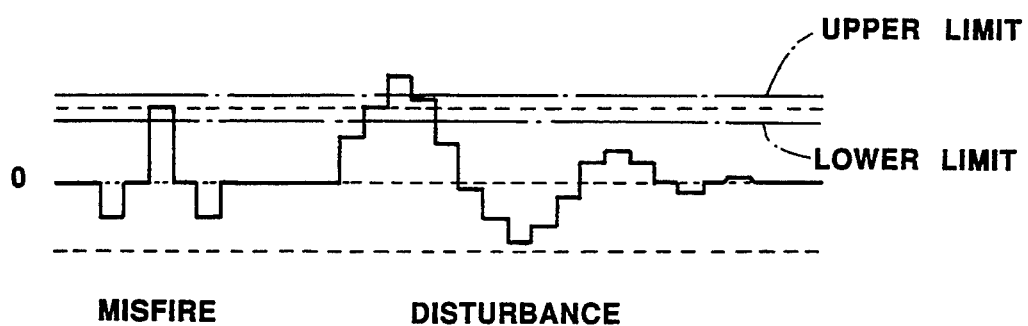
FIG. 9 is a timing chart of an exemplified variation of engine rpm (i.e., crankshaft rotational speed)

That is, in the case of judging of misfire from the engine rpm condition, misjudgment is liable to be caused due to a variation or fluctuation of an engine rpm upon running on a rough road. However, as shown in FIG. 9, an upper limit value is set with respect to the judgment level, so that when an engine rpm variation exceeds beyond the upper limit value, it is judged that the variation is caused by disturbance, thus making it possible to prevent misjudgment upon vehicle running on a rough road.

Figure 10:
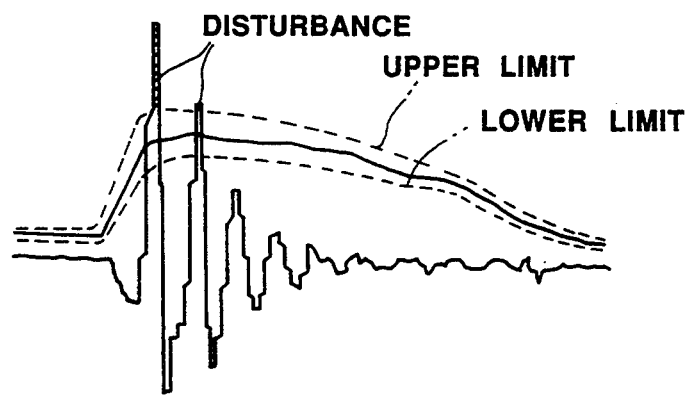
FIG. 10 is a diagram of an exemplified variation of engine rpm after changing of gear.

Further, in the case other than vehicle running on a rough road, such as the time of clutch engagement after gear shifting, engine rpm varies as shown in FIG. 10. Since in such a case the engine rpm variation exceeds beyond the upper limit value, it is judged that the variation is caused by disturbance, thus making it possible to prevent misjudgment.

Thus, the misfire detecting device can be highly reliable in operation.

Figure 11:
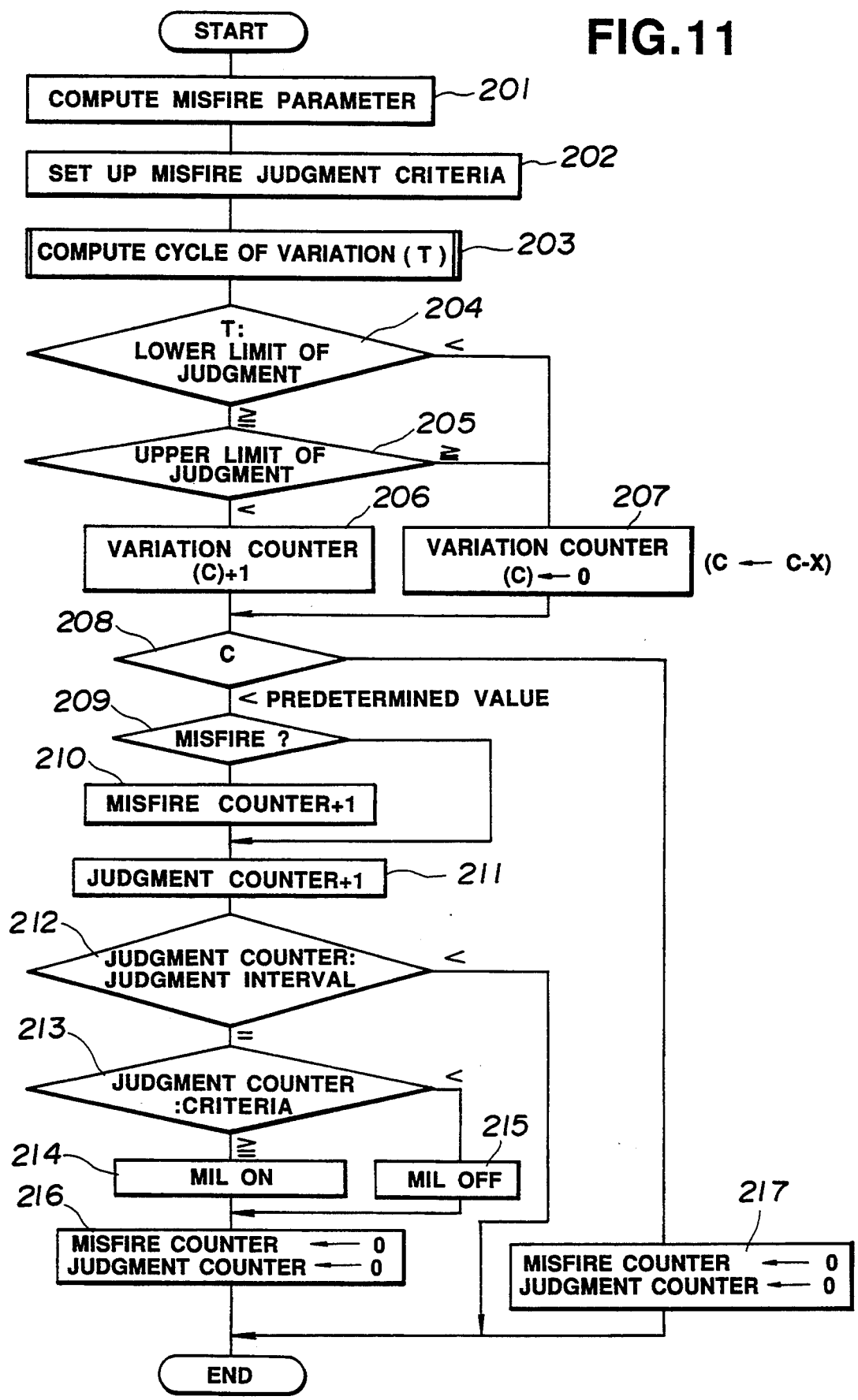
FIG. 11 is a flowchart of judgment of misfire according to a further embodiment.

FIG. 11 shows a flowchart of judgment of misfire according to a further embodiment. In this embodiment, judgment of vehicle running on a rough road is made from a cycle of variation of rotational times (rotational speeds) during combustion strokes of each cylinders for thereby preventing misjudgment of misfire.

Firstly, at steps 201 and 202, the misfire parameter is calculated similarly to the previous embodiment of FIGS. 8 to 10, so that misfire judging criteria are set.

Then, at step 203 the interval "T" (variation cycle) at which misfire parameters exceeding the misfire judging criteria are generated, is calculated. At steps 204 and 205, it is judged whether the variation cycle "T" is within a predetermined range (predetermined frequency range: $5 \sim 15$ Hz).

At step 206, when the variation cycle "T" is within the predetermined range a variation counter is made to count +1 and when not within the predetermined range the variation counter is made to count −1.

When the counted number of the variation counter is equal to or smaller than a predetermined value, the flow proceeds from step 208 to step 209 and onward to make judgment of misfire, i.e., a misfire counter is made to count +1 each time when it is judged that misfire has occurred while a judgment counter is made to count +1 each time when a judgment of misfire is made.

On the other hand, when the counted number of the variation counter exceeds beyond a predetermined value ($5 \sim 10$), it is judged that the vehicle is running on a rough road, so that the flow proceeds from step 208 to step 217 to reset the misfire counter and the judgment counter and suspend judgment of misfire.

At step 212 and onward, when the counted number of the judgment counter amounts to a predetermined number the rate of occurrence of misfire is calculated, so that when the rate of occurrence of misfire is equal to or larger than a predetermined value an indication such as a warning is given.

In the meantime, the steps $203 \sim 208$, 217 correspond to the suspending means 23 of FIG. 3 and the steps 209 and onward correspond to the judgment means 22.

Figure 12:
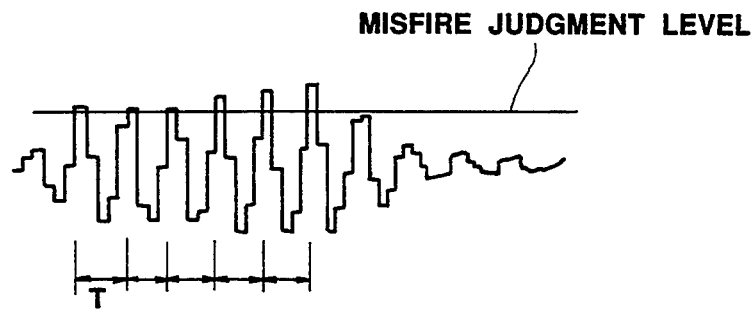
FIG. 12 is a diagram of an exemplified variation of engine rpm when a vehicle is running on a rough road.

Upon vehicle running on a rough road, an impact is applied to the engine through the drive train. The variation of engine rpm resulting form that impact is determined depending upon the spring constant and the mass of inertia of the drive train and is generated at a predetermined cycle (10 Hz) as shown in FIG. 12.

That is, when the variation of engine rpm occurs at a predetermined cycle during a predetermined period, it is judged that the vehicle is running on a rough road, so that in such a case judgment on misfire is suspended for thereby preventing misjudgment assuredly.

In the meantime, the engine rpm variation cycle may be obtained by measuring the time interval at which the misfire parameter is changed from negative to positive or positive to negative. Further, the engine rpm variation cycle may be obtained from the time interval at which the rotational times (rotational speeds) during combustion strokes change its variation tendency from increase to decrease.

Figure 13:
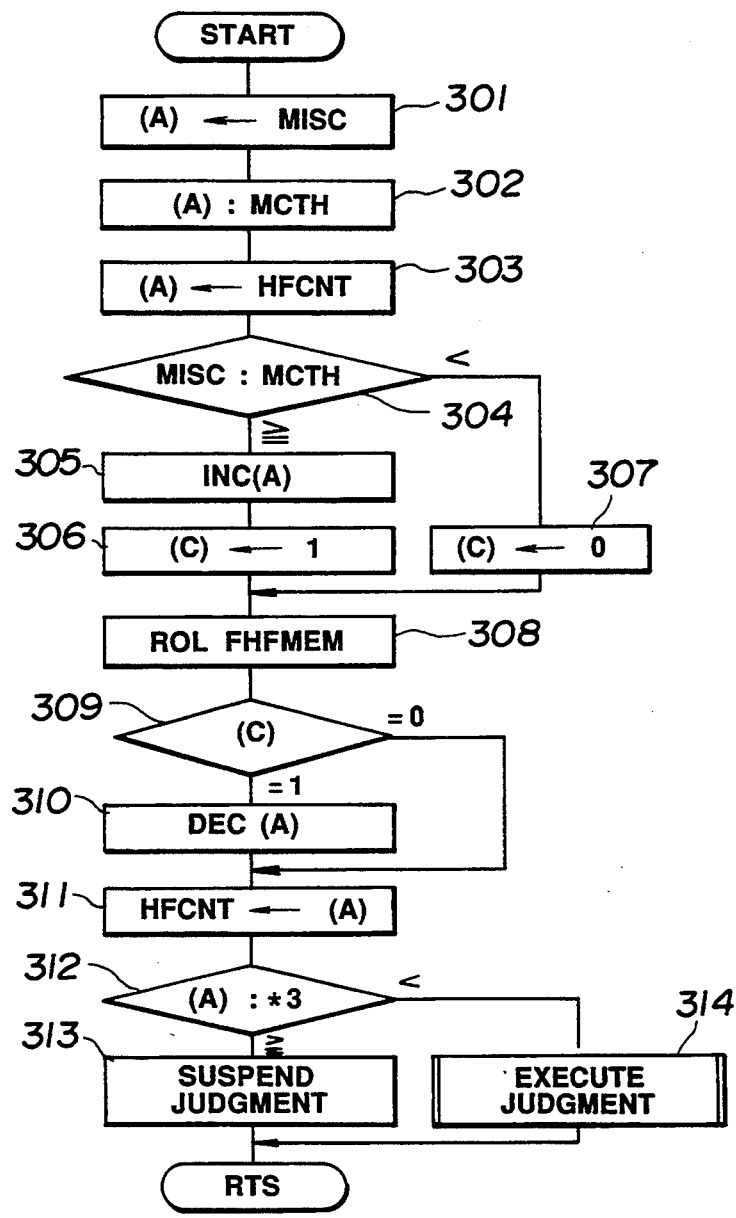
FIG. 13 is a flowchart for judgment of misfire according to a further embodiment.

FIG. 13 shows a flowchart for judgment of misfire according to a further embodiment of this invention. In this embodiment, judgment of running on a rough road is made to prevent misjudgment of misfire.

Firstly, at step 301 and 302, a misfire parameter MISC is calculated in a manner similar to the previous embodiment of FIGS. 11 and 12, and a rough road judging level MCTH is set. The rough road judging level MCTH is a smaller value than a misfire judging level.

At step 304 a misfire parameter MISC is compared with a rough road judgment level MCTH so that when the misfire parameter MISC is larger the flow proceeds to step 306 where the carry of a counter memory is set and when the misfire parameter MISC is smaller the flow proceeds to step 307 to clear the carry of the counter memory.

At step 308 the counter memory is rolled out so that from its bit the number of times HFCNT for which the misfire parameter MISC exceeds the rough road judgment level HCTH is read at step 311.

In this instance, the data of the last eight times of judgments are stored in the counter memory.

At step 312, when, of the last eight times of judgments, the number of times HFCNT for which the misfire parameter MISC exceeds the rough road judgment level MCTH is equal to or larger than three times, judgment of misfire is suspended until the number of times HMCNT becomes smaller than three times.

Figure 14:
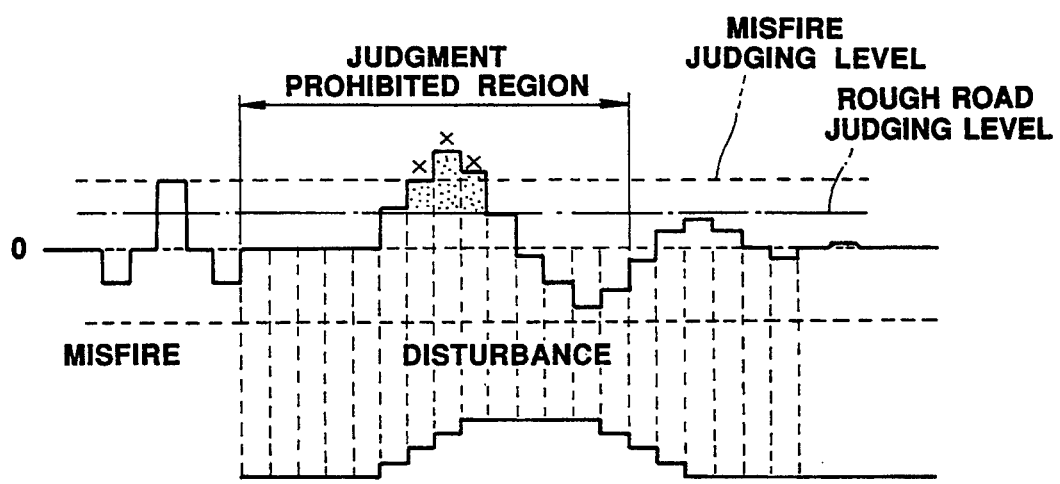
FIG. 14 is a timing chart of an exemplified variation of engine rpm when a vehicle is running on a rough road.

In FIG. 14, it is shown a judgment prohibiting interval when HMCNT is four times.

On the other hand, when HMCNT is smaller than three times, the flow proceeds to step 314 where the misfire parameter MISC is compared with the misfire judgment level to make judgment of misfire.

In the meantime, the steps 304~313 correspond to the suspension means 23 of FIG. 3.

Figure 15:
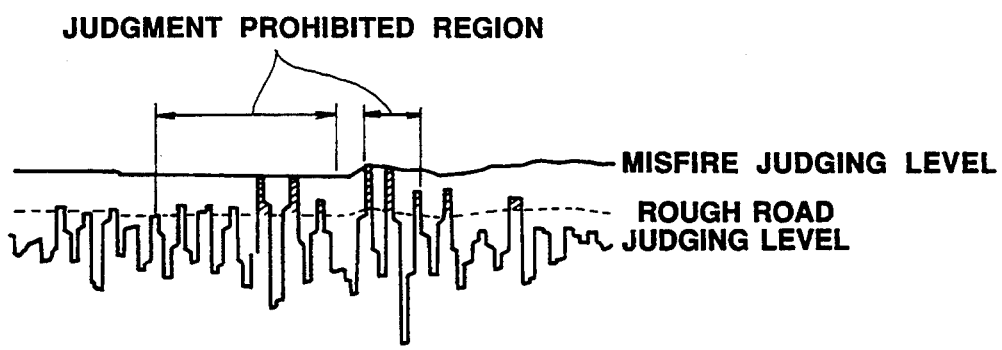
FIG. 15 is a diagram off another exemplified variation off engine rpm when a vehicle is running on a rough road.

During vehicle running on a rough road, considerable variations of engine rpm continue for a certain period. That is, in the case where the misfire parameter exceeds the misfire judgment level at a certain moment, it also fluctuates at the former and latter moments to exceed the rough road judgment level for several times as shown in FIG. 15.

By this, when the engine rpm variation level, i.e., the misfire parameter, exceeds a predetermined level for more than a predetermined number of times during a predetermined period, it becomes possible to judge that the vehicle is running on a rough road for thereby preventing misjudgment assuredly.

Further, when HMCNT of the last eight times of judgments is larger than three times, judgment of misfire is suspended, so that actual occurrence of misfire is detected assuredly.

In the meantime, when the data of the last sixteen times of judgments are available, it is judged that the vehicle is running on a rough road when HMCNT is equal to or larger than five times.

Figure 16:
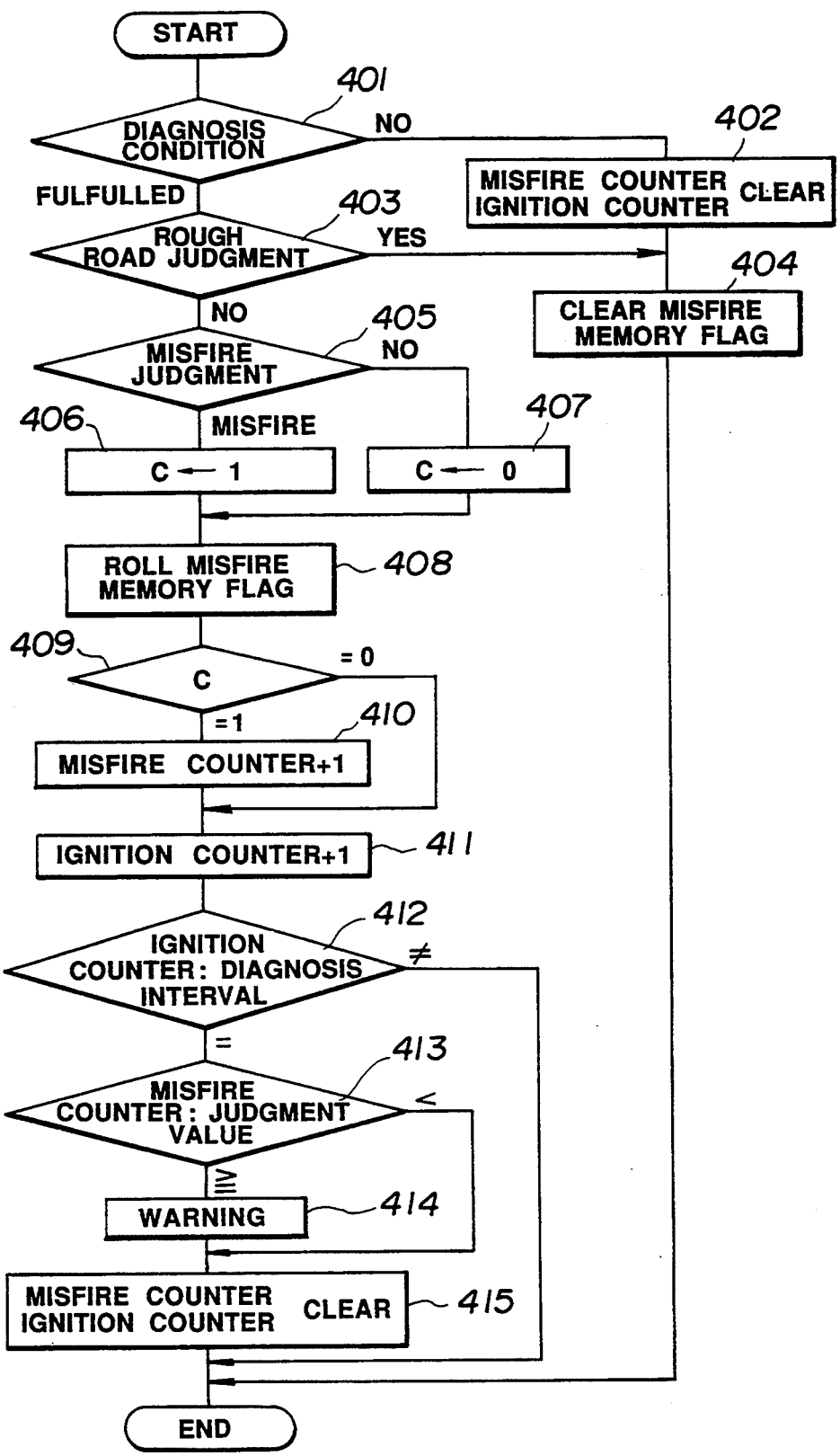
FIG. 16 is a flowchart for judgment off misfire according to a further embodiment off the present invention.

FIG. 16 shows a flowchart for judgment of misfire according to a further embodiment. In this embodiment, when it is judged that misfire has occurred, the judgment is not counted at once but counted after delay of a predetermined time.

The diagnosis conditions at step 401 are such that when a variation of a throttle valve opening is small and engine rpm, engine load, etc. are within predetermined ranges it is judged that the diagnosis conditions are fulfilled. The rough road judgment at step 403 may be the same with that shown in FIGS. 11 and 13.

At step 405, the misfire parameter is computed and compared with a predetermined judgment level so that when it is judged that misfire has occurred the flow proceeds to step 406 where the carry of the misfire memory flag is set and when it is judged that misfire has not occurred the flow proceeds to step 407 where the carry of the misfire memory flag is cleared and to step 408 where the misfire memory flag is rolled out.

And, at step 406, when the carry of "1" is back, the misfire counter is made to count +1. At step 411, each time when it is judged that misfire has occurred the ignition counter (judgment counter) is made to count +1. In response to judgment that misfire has occurred, counting of occurrence of misfire is delayed for a time corresponding to a predetermined bit of the misfire memory flag.

On the other hand, after judgment of vehicle running on a rough road is made at step 403, the flow proceeds to step 404 where the misfire memory flag is cleared. When it is judged that the vehicle is running on a rough road, the memory portion of the misfire memory flag is not counted.

In the meantime, at step 412 and onward, when the counted number of the ignition counter amounts to a predetermined value, the rate of occurrence of misfire is calculated so that when the rate of occurrence of misfire is equal to or larger than a predetermined value a warning, etc. is given.

Judgment of misfire is made each time when ignition occurs. However, judgment of running on a rough road, etc. takes a certain period so that counting of occurrence of misfire is delayed for a time corresponding to that period.

In this manner, when the judgment of running on a rough road, etc. is made after judgment of misfire, the once counted number of the counter needs not to be decreased after the final judgment, thus making its processing be easy.

Further, if the counted number of occurrence of misfire is cleared each time when the vehicle comes to run on a rough road, judgment of misfire may be encountered by some hindrance. However, by delaying counting of occurrence of misfire, it becomes possible to count occurrence of misfire assuredly and perform accurate diagnosis of misfire.

Figure 17:
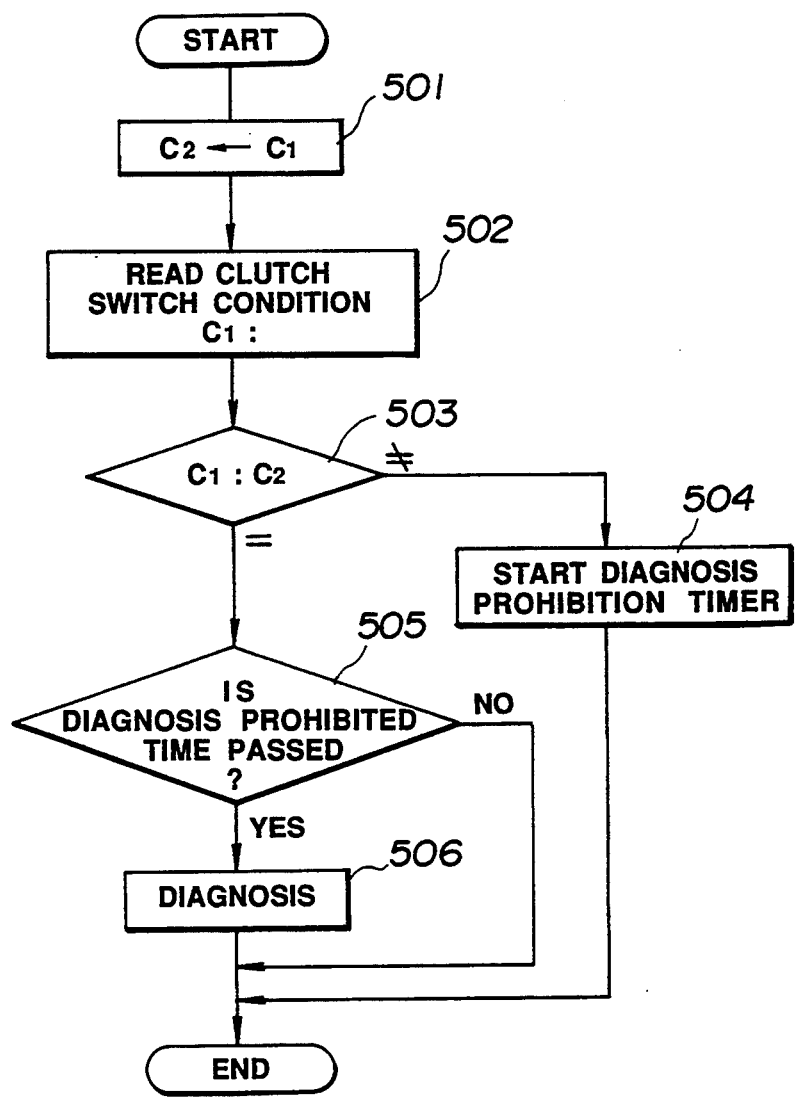
FIG. 17 is a flowchart for judgment off misfire according to a further embodiment off the present invention.

FIG. 17 shows a flowchart of judgment of misfire according to a further embodiment. In this embodiment, engagement and disengagement of the clutch is detected so that during changing of clutch engagement the diagnosis of misfire is suspended.

In FIG. 17, $C_1$ represents the present condition of the clutch switch, and $C_2$ represents the condition of the last detection so that for a predetermined time after the present condition $C_1$ comes to differ from the last time condition $C_2$ the diagnosis of misfire is prohibited (steps 501~505).

Figure 18:
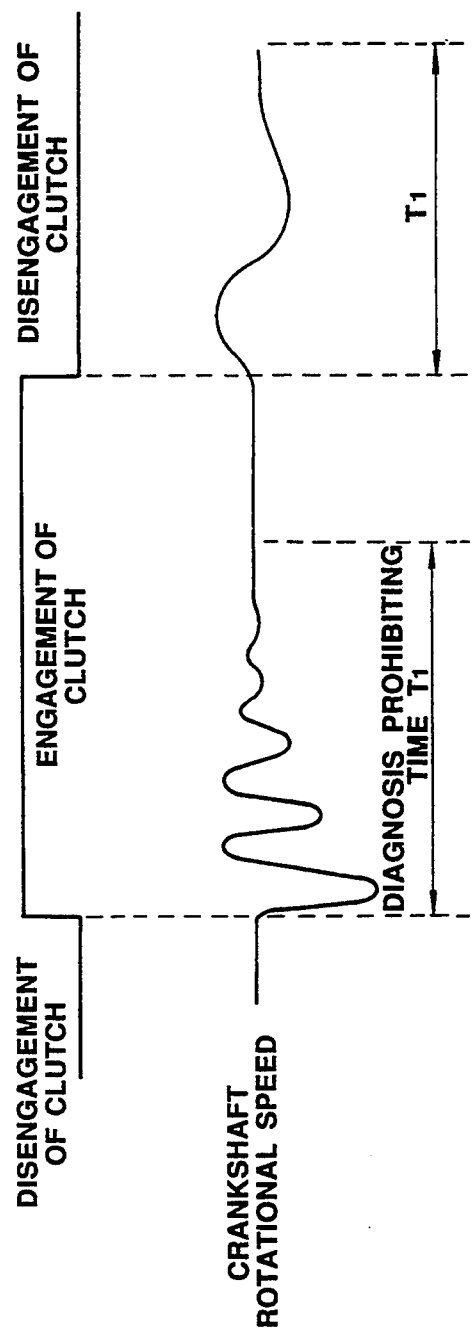
FIG. 18 is a diagram of an exemplified variation of engine rpm when clutch engagement is changed.

While during changing of clutch engagement the engine rpm varies as shown in FIG. 18, misjudgment can be prevented by the above process.

What is claimed is:

1. A device for detecting misfire of an internal combustion engine, comprising:

rotational speed measurement means for measuring crankshaft rotational speed during a combustion stroke of each cylinder; and judgment means for judging misfire of the engine from a variation of a crankshaft rotational speed during a combustion stroke of each cylinder;

said rotational speed measurement means including a first sensor for detecting an angle of rotation of a crankshaft of the engine and producing a first signal representative thereof, a second sensor for detecting a reference crank position at each cylinder of the engine and producing a second signal discriminating a cylinder at which the reference crank position is obtained, and measurement period setting means for setting, at initial measurement, a measurement period for measurement of crankshaft rotational speed at a corresponding cylinder by counting a predetermined number of first signals produced by said first sensor on the basis of a second signal produced by said second sensor and setting, after said initial measurement, a measurement period for measurement of crankshaft rotation speed at each cylinder by counting a predetermined number of first signals produced by said first sensor on the basis of the first signals of the previous measurement periods.

2. A device for detecting misfire of an internal combustion engine, comprising:

rotational speed measurement means for measuring crankshaft rotational speed during a combustion stroke of each cylinder; and judgment means for judging misfire of the engine from a variation of a crankshaft rotational speed during a combustion stroke of each cylinder;

said rotational speed measurement means including a first sensor for detecting an angle of rotation of a crankshaft of the engine and producing a first signal representative thereof, a second sensor for detecting a reference crank position at each cylinder of the engine and producing a second signal discriminating a cylinder at which the reference crank position is obtained, and first measurement means for counting, at an initial stage of measurement, a predetermined number of first signals produced by said first sensor means on the basis of a second signal produced by said second sensor means and measuring crankshaft rotation speed at combustion stroke of a corresponding cylinder from the lapse of time of a measurement period during which the predetermined number of first signals are counted, and second measurement means for counting, at a secondary stage of measurement, a predetermined number of first signals on the basis of the first signals of the previous measurement period repeatedly and measuring crankshaft rotation speeds at combustion strokes of corresponding cylinders from the times for lapse of the measurement periods during which the predetermined number of first signals are counted.

3. A device for detecting misfire of an internal combustion engine, comprising:

first sensor means for detecting an angle of rotation of a crankshaft of the engine and producing a first signal representative thereof;

second sensor means for detecting a reference crank angle for each cylinder of the engine and producing a second signal representative thereof;

first measurement means for counting, at an initial stage of measurement, a predetermined number of first signals produced by said first sensor means on the basis of a second signal produced by said second sensor means and measuring crankshaft rotation speed at combustion stroke of a corresponding cylinder from a time for lapse of a measurement period during which the predetermined number of first signals are counted;

second measurement means for counting, at a second stage of measurement, a predetermined number of first signals on the basis of the first signals of the previous measurement period repeatedly and measuring crankshaft rotation speeds at combustion strokes of corresponding cylinders from the times for lapse of the measurement periods during which the predetermined number of first signals are counted;

judging means for judging of misfire on the basis of a variation of crankshaft rotation speed at the measurement periods during combustion strokes of each cylinder; and third measurement means for measuring a phase difference between a predetermined first signal produced by said first sensor means and a predetermined second signal produced by said second sensor means, and suspension means for suspending judgment of misfire by said judging means when a phase difference between said predetermined first and second signals goes beyond a predetermined range, wherein said first sensor means comprises a flywheel rotatable with the crankshaft of the engine and having at an outer periphery a ring gear, and a rotational angle sensor for producing a first signal each time when the crankshaft rotates a predetermined angle which is determined by the number of teeth of said ring gear.

4. The device according to claim 3, wherein said second sensor means comprises a reference angle sensor for detecting a reference crank angle of said crankshaft through detection of a reference position of a camshaft of the engine and producing a second signal each time that the reference crank angle is attained at each cylinder.

5. The device according to claim 4, wherein said phase difference is a signal interval between a first signal discriminating a certain cylinder and first one of second signals which are produced by said rotational angle sensor during a measurement period for said certain cylinder.

* * * * *